Nov. 11, 1924.
B. G. RICHARDS
CAR MOUNTING
Filed March 11, 1922
1,514,672
2 Sheets-Sheet 2
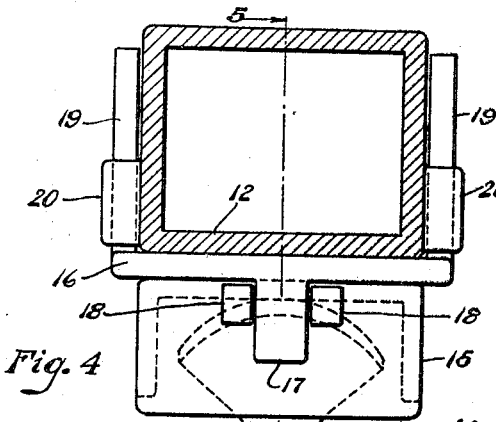
Fig. 4
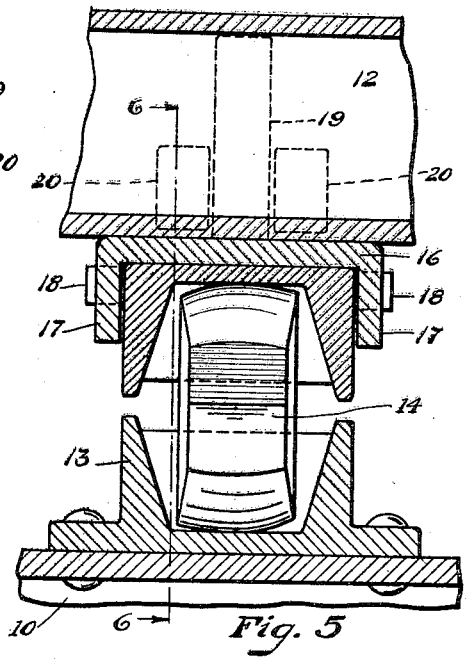
Fig. 5
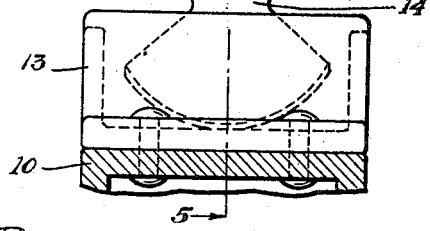
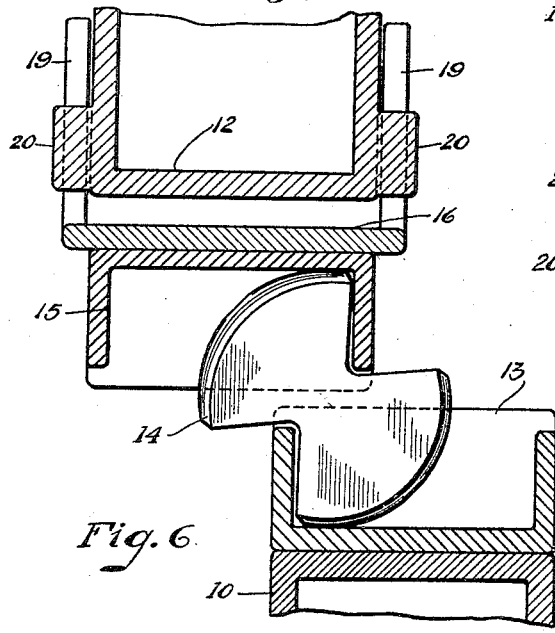
Fig. 6
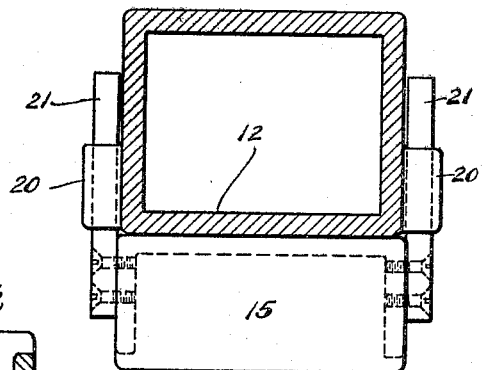
Fig. 7
Witnesses:
Wm. Schnellhardt.
Berthold Olert.
Inventor:
Braxton G. Richards
By Joshua R. H. Potts
His Attorney Patented Nov. 11, 1924.

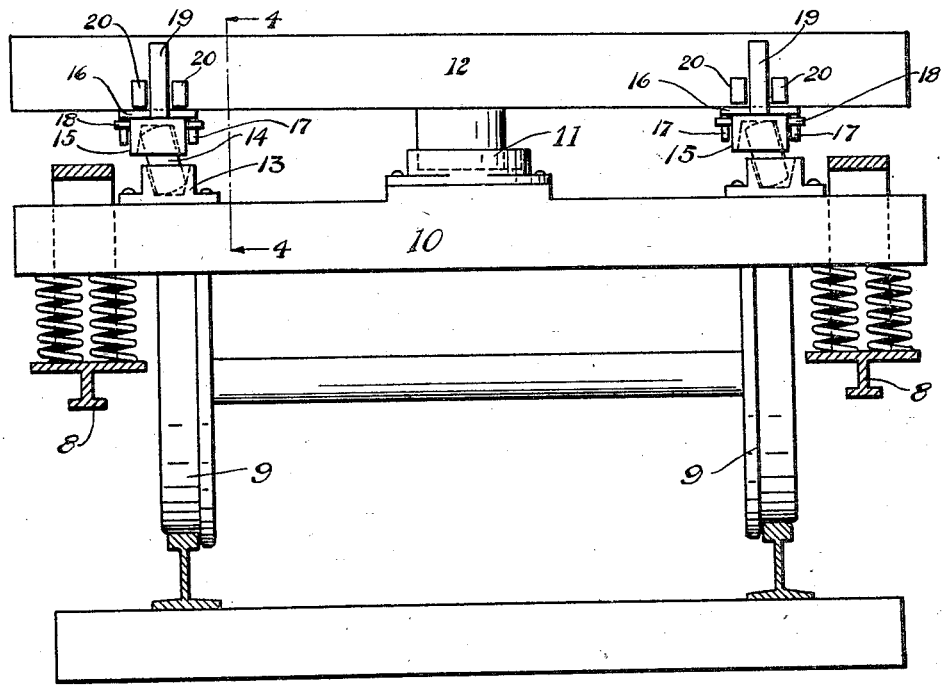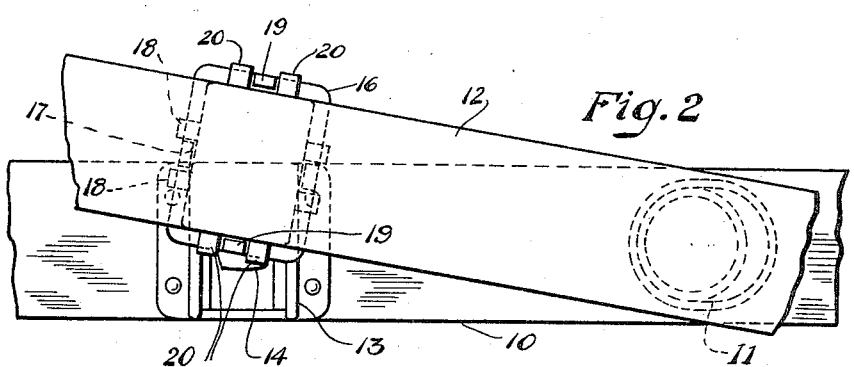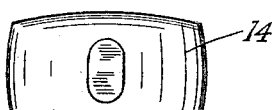

1,514,672

UNITED STATES PATENT OFFICE.

BRAYTON G. RICHARDS, OF CHICAGO, ILLINOIS, ASSIGNOR OF ONE-HALF TO ELMYR A. LAUGHLIN AND ONE-HALF TO JOSHUA R. H. POTTS, BOTH OF CHICAGO, ILLINOIS.

CAR MOUNTING.

Application filed March 11, 1922. Serial No. 542,894.

*To all whom it may concern:*

Be it known that I, BRAYTON G. RICHARDS, a citizen of the United States, and a resident of the city of Chicago, county of Cook, and State of Illinois, have invented certain new and useful Improvements in Car Mountings, of which the following is a specification.

My invention relates to improvements in car mountings and has for its object the provision of an improved construction of this character which is highly efficient in use and capable of economical production.

Other objects will appear hereinafter.

The invention consists in the combinations and arrangements of parts hereinafter described and claimed.

The invention will be best understood by reference to the accompanying drawings forming a part of this specification, and in which, Fig. 1 is a partial transverse section of a truck equipped with a car mounting embodying the invention, Fig. 2 is an enlarged top plan view of portions of the car and body bolsters with the parts shown in the positions assumed when the truck turns relatively to the car body, Fig. 3 is a top plan view of one of a plurality of rocker members employed in the mounting, Fig. 4 is an enlarged section taken substantially on line 4—4 of Fig. 1, Fig. 5 is a section taken substantially on line 5—5 of Fig. 4, Fig. 6 is a section taken substantially on line 6—6 of Fig. 5 but showing the parts in the position assumed when the truck turns and the corresponding portion of the car body lifts as in turning a curve, and Fig. 7 is a view illustrating a modified form of construction.

The form of construction illustrated in Figs. 1 to 6 inclusive comprises the usual truck 8 mounted to run upon the usual wheels 9 and provided with the usual truck bolster 10 as indicated. The truck bolster 10 is connected by means of the usual center bearing 11 with the usual car body bolster 12 and whereby the car body is pivotally connected with the truck and a certain amount of lateral motion permitted as indicated in Fig. 1. A bearing housing 13 is arranged adjacent each end of the truck bolster 10 as shown. Each of the bearing housings 13 is in substantially box-like form with upwardly tapering side walls and open at the top. A rocker member 14 is arranged in each of the housings 13 to project upwardly therefrom. The rocker member 14 is provided with indented ends as shown cooperating with the ends of the housing 13 to compel rocking of the rocker when the housing moves longitudinally as illustrated in Fig. 6. Each of the rocker members 14 is preferably of eccentric or irregular form to tend to automatically maintain the truck in centered relation under the car body and is designed and intended and adapted to carry the entire proportionate load of the car body, the center bearing 11 serving merely for the purpose of effecting a pivotal connection between the car body and the truck and to limit lateral motion of the car body relatively to the truck. The specific bearing contour of the rocker is an old and well known form of rocker, the same being illustrated and described in the prior patent to Elmyr A. Laughlin, No. 1,396,688, granted November 8, 1921.

Co-operating with each rocker is an upper bearing housing 15 similar in all respects to the lower housing 13 except that it is inverted and fits over the upper portion of the rocker. A bearing plate 16 is interposed between each of the upper housings 15 and the corresponding body bolster 12. Each of the bearing plates 16 is provided at opposite sides with depending lugs 17 fitting loosely between lugs 18 on the sides of the housing 15. Each of said bearing plates 16 is also provided at its ends with upwardly extending lugs or arms 19 fitting loosely between lugs 20 on the sides of the body bolster and whereby the body bolster may lift or tilt as in turning a curve without lifting the upper housing 15 or disturbing the engagement of the housings with the rocker 14. In this way a very simple and durable rocker may be employed without side lugs, teeth, or projections of any kind and it is impossible for the rocker to become displaced or out of proper position.

In the modified form of construction illustrated in Fig. 7, each upper housing 15 is provided at its ends with upwardly extending arms 21 fitting loosely between the lugs 20 on the sides of the body bolster 12 and whereby the employment of the bearing plate 16 is dispensed with.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The combination with a truck and body mounted thereon, of a bearing housing on said truck; a rocker in said housing and projecting upwardly therefrom; an upper housing fitting over the upper portion of said rocker; co-operating means on said rocker and housings compelling rocking of the rocker upon longitudinal movement of the housings relatively to each other; and a vertically slidable connection between said body and said upper housing permitting lifting of said body without lifting said upper housing, substantially as described.

2. The combination with a truck and body mounted thereon, of a bearing housing on said truck; a rocker in said housing and projecting upwardly therefrom; an upper housing fitting over the upper portion of said rocker, said rocker having indented ends co-operating with the ends of the housing to compel rocking of the rocker upon longitudinal movement of the housing; and a vertically slidable connection between said body and upper housing permitting lifting of said body without lifting said upper housing, substantially as described.

3. The combination with a truck and a car body pivotally mounted thereon, of a lower box-like housing open at the top; a rocker in said housing and projecting upwardly therefrom; an upper box-like housing open at the bottom and fitting over the upper portion of said rocker, said rocker having indented ends and the ends of said housings co-operating with said indented ends to compel rocking of said rocker upon longitudinal movement of said housings relatively to each other; a bearing plate interposed between the upper housing and the body bolster; depending lugs at opposite sides of said bearing plate; lugs on the sides of the upper housing arranged on opposite sides of said depending lugs; upwardly extending lugs on opposite ends of said bearing plate; and lugs on the sides of the body bolster arranged on opposite sides of said upwardly extending lugs, substantially as described.

In testimony whereof I have signed my name to this specification in the presence of two subscribing witnesses.

BRAYTON G. RICHARDS.

Witnesses:
 FREDA C. APPLETON,
 MARGARET AUER.